United States Patent [19]
Okumura et al.

[11] 3,806,861
[45] Apr. 23, 1974

[54] ULTRASONIC WAVE TYPE COLLISION PREVENTING SYSTEM

[75] Inventors: Osamu Okumura; Yukiyasu Watanabe, both of Kyoto, Japan

[73] Assignee: Mitsubishi Denki Kabushiki Kaisha, Chiyoda-ku, Tokyo, Japan

[22] Filed: July 25, 1972

[21] Appl. No.: 275,065

[30] Foreign Application Priority Data
Aug. 30, 1971 Japan.............................. 46-63421
Nov. 9, 1971 Japan.............................. 46-89190
Nov. 9, 1971 Japan.............................. 46-89191

[52] U.S. Cl................... 340/1 R, 340/3 E, 343/7.5, 343/112 CA
[51] Int. Cl............................................... G01s 9/68
[58] Field of Search............. 340/3 E, 1 R; 343/7.5, 343/112 CA

[56] References Cited
UNITED STATES PATENTS

| | | | |
|---|---|---|---|
| 3,493,920 | 2/1970 | MacMunn........................... | 340/1 R |
| 3,019,434 | 1/1962 | Bushnell et al. .................. | 343/7.5 X |
| 2,921,302 | 1/1960 | Cartwright.......................... | 343/7.5 |
| 3,283,292 | 11/1966 | Kay..................................... | 340/1 R |
| 3,562,749 | 2/1971 | Uchimoto et al. ................. | 340/3 E X |

Primary Examiner—Richard A. Farley
Attorney, Agent, or Firm—Oblon, Fisher, Spivak, McClelland & Maier

[57] ABSTRACT

An ultrasonic wave type collision preventing system for preventing collision between two relatively moving members has a first transmitting element for transmitting ultrasonic wave signals having a specific period and a first receiving element for receiving the ultrasonic wave signal from the first transmitting element. A second transmitting element for transmitting an ultrasonic wave signal corresponding to the first receiving element and a second receiving element for receiving the ultrasonic wave signal from the second transmitting element are provided. An output device for indication of an alarm condition is provided and operates when the second receiving element receives the ultrasonic wave signal from the second transmitting element during a specific time period as set by a gate after the transmission of the ultrasonic wave signal from the first transmitting element. One of the two relatively moving members is fitted to the first transmitting element, the second receiving element and the output device and the other member is fitted to the first receiving element and the second transmitting element. Further means are provided for enabling a collision alarm condition to be selectively prevented even when the relatively moving members are within a specific distance where an alarm condition would generally be indicated.

5 Claims, 5 Drawing Figures 3,806,861

ULTRASONIC WAVE TYPE COLLISION PREVENTING SYSTEM

BACKGROUND OF THE INVENTION

1. Field of the Invention

This invention relates to an ultrasonic wave type collision preventing system which is useful for preventing the collision of a moving means, such as a crane on a ceiling.

2. Description of the Prior Art

In the past, conventional collision preventing systems used for moving means, such as a crane on a ceiling, have used a system wherein a photoelectric tube was geometrically faced to a projector of light or wherein a receiver of electromagnetic waves was provided and when the electric field intensity received thereby was higher than a specific value a dangerous condition would be indicated.

While somewhat satisfactory, the system using light had disadvantages in that it could not be used in an atmosphere of smoke or steam. A maintenance problem also existed in that the surface of the lens had to be continuously cleaned which was quite troublesome.

While also somewhat satisfactory, the system using electromagnetic waves had disadvantages in that deviation in the range of calibration and the installation cost were high.

Other conventional systems used ultrasonic waves wherein a continuous wave was transmitted in the direction of an intercepting receiver. The prior art ultrasonic wave systems were also found to have certain disadvantages in that the distance calibration thereof was unstable because of the effect of wind and the like.

SUMMARY OF THE INVENTION

It is a first object of this invention to provide a new and improved ultrasonic wave type collision preventing system for accurately preventing a collision between relatively moving means, such as a crane, by using ultrasonic wave signals.

It is a second object of this invention to provide a new and improved ultrasonic wave type collision preventing system wherein the distance calibration between two members can be easily provided for preventing the collision thereof.

It is a third object of this invention to provide a new and improved ultrasonic wave type collision preventing system for preventing any undesirable collision.

The foregoing and objects and features of this invention can be attained, in one aspect, by providing a system wherein an ultrasonic wave signal is intermittenly oscillated in a specific periodicity and the distance calibration is provided in accordance with the period that it takes to propagate the ultrasonic wave signal in air towards and to return from the two members for which collision is to be prevented. A transmitter for providing the ultrasonic wave signal is set on each of the two members which are relatively moved.

BRIEF DESCRIPTION OF THE DRAWINGS

These and other objects and further features of this invention will be more readily appreciated from the following detailed description when considered in connection with the accompanying drawings wherein.

DETAILED DESCRIPTION OF THE PREFERRED EMBODIMENTS

Figure 1:
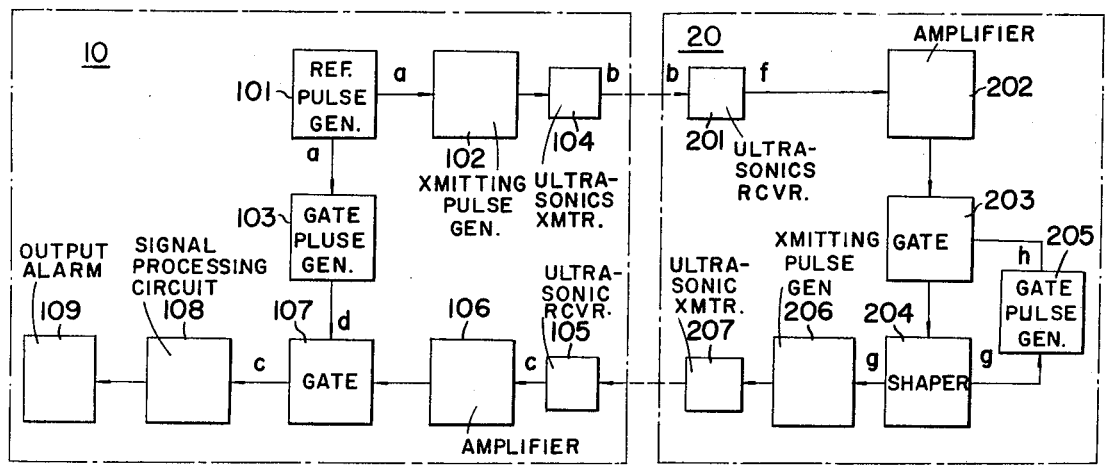
FIG. 1 is a block diagram of one preferred embodiment of the system according to this invention.

Referring now to the drawings wherein like reference numerals designate identical or corresponding parts throughout the several views and more particularly to FIGS. 1 and 2a–2h thereof wherein a block diagram of one preferred embodiment according to this invention and a graph of the signal wave shapes for describing the operation of FIG. 1 are respectively shown. In FIGS. 1 and 2a–2h the reference numeral 10 designates a body of the ultrasonic wave type collision preventing system which is fitted on one of the two members for which it is desired to prevent from colliding and the reference numeral 20 designates an active reflector which is fitted on the other one of the two members.

Figure 2:
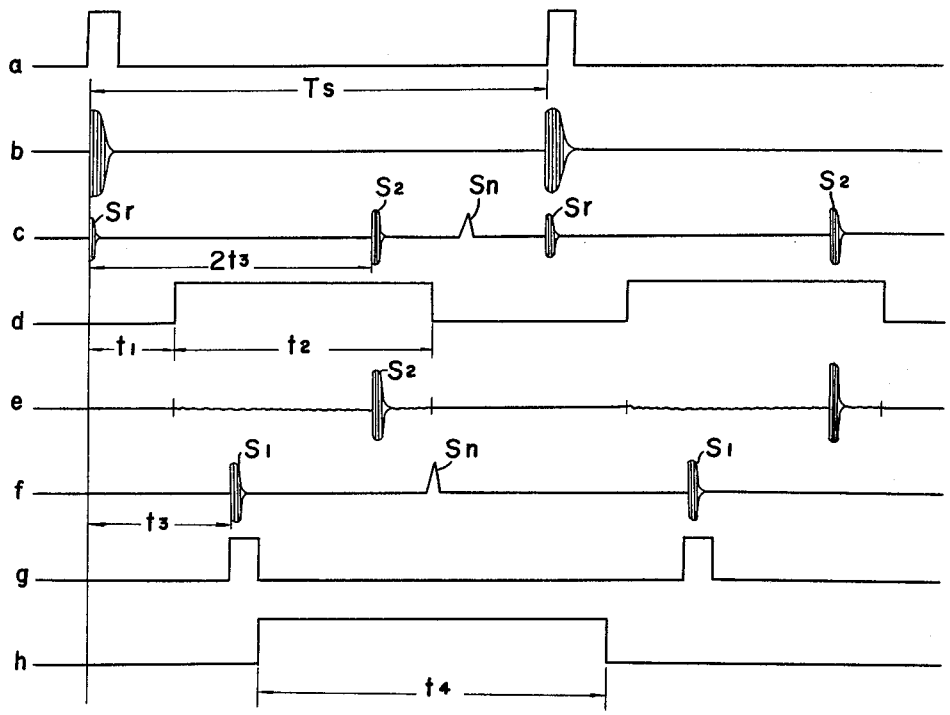
FIG. 2 is a graph for showing signal waveforms at various portions of the block diagram of FIG. 1.

In the body 10, a reference pulse generating circuit 101 is provided for generating a reference pulse having a period Ts as shown in the FIG. 2a. The reference pulse is supplied to a transmitting pulse generating circuit 102 and a gate pulse generating circuit 103. The reference numeral 104 designates a transmitting element, such as a piezo-electric element or an electric distortion element, which is driven by the transmitting pulse generating circuit 102 to transmit an ultrasonic wave pulse, which pulse is synchronized to the reference pulse as shown in the FIG. 2b in a forward direction from the body 10.

The reference numeral 105 designates a receiving element, such as a piezo-electric element or an electric distortion element, which receives the ultrasonic wave pulse which is returned from the active reflector 20 and converts the same into a corresponding electrical signal. The ultrasonic wave signal received by the receiving element 105 is the secondary ultrasonic wave signal which is returned from the body 10 through the active reflector 20.

The electric signal converted at the receiving element 105 contains the secondary wave signal $S_2$ which is delayed for a period of $2t_3$ from the time of transmission of the ultrasonic wave pulse by the transmitting element 104, as shown in the FIG. 2c.

The period $t_3$ is the time required for propagating the ultrasonic wave signal between the body 10 and the active reflector 20 and is in proportion to the distance between the two members for which collision is to be prevented.

The electric signal, as shown in the FIG. 2c, also contains a transmitting leak signal Sr and a noise pulse Sn, along with the secondary wave signal $S_2$. The transmitting leak signal Sr is the signal sent directly from the transmitting element 104 to the receiving element 105.

The electric signal shown in the FIG. 2c is then amplified by an amplifier circuit 106 and supplied to a gate circuit 107.

The gate circuit 107 is controlled by the gate pulse shown in FIG. 2d which is formed in the gate pulse generating circuit 103. The gate circuit 107 is opened after a specific period $t_1$ from the time of transmission of the ultrasonic wave pulse by the transmitting element 104 and is closed after a specific period $t_2$ from the time of opening. During the opening of the gate circuit 107 only those signals of the received signals (FIG. 2c) present in the gap between the gate pulse are passed as shown in the FIG. 2e.

The reference numeral 108 designates a signal processing circuit and the reference numeral 109 designates an output circuit. The signal processing circuit 108 determines whether the secondary signal $S_2$ is contained in the signal which has passed through the gate circuit 107. Only when the secondary signal $S_2$ is present will an output signal be supplied to the output circuit 109.

When the output circuit 109 receives an output signal from the signal processing circuit 108, an alarm signal is generated to flash an alarm lamp, to make an alarm sound by a buzzer or to activate a controller of the crane or the like.

The active reflector 20 is a device for amplifying the received pulse signal and for returning the same back. In the active reflector 20, the reference numeral 201 designates a receiving element, such as a piezoelectric element or an electric distortion element, and may be the same as the transmitting element 104 or the receiving element 105 which are incorporated in the body 10. The receiving element 201 receives the ultrasonic wave pulse transmitted from the transmitting element 104 of the body 10 and converts it into a corresponding electrical signal.

The electric signal converted by the receiving element 201 contains a primary signal $S_1$ delayed for the period $t_3$ from the reference pulse of the body 10 as well as the noise pulse Sn, as shown in the FIG. 2f, and is amplified in an amplifier circuit 202. The amplified signal is then supplied to a gate circuit 203. The gate circuit 203 is such as to be usually opened at the time that no-signal is supplied thereto. However, when a signal is received, the waveform thereof is first shaped by a waveform shaping circuit 204, as shown in the FIG. 2g, and a gate pulse generating circuit 205 is then triggered by the output from the shaping circuit 204 whereby the gate circuit 203 is closed for the period $t_4$ by the gate pulse as shown in the FIG. 2h.

As a result thereof, in the gap period $t_4$, the output of the waveform shaping circuit 204 is not shortened to less than the gap period $t_4$. Accordingly, when the gap period $t_4$ is selected so as to be slightly smaller than the reference pulse period, it is possible to effectively shape the waveform of only the normal and periodic primary signal $S_1$.

The output of the waveform shaping circuit 204 is also supplied to a transmitting pulse generating circuit 206 such that an ultrasonic wave pulse from a transmitting element 207 which is driven by the transmitting pulse generating circuit 206 is returned back in the direction of the body 10.

The transmitting element 207 is a piezo-electric element or an electric distortion element and may be the same as the transmitting element 104 or the receiving elements 105 and 201.

In the system having the above-mentioned structure, the alarm signal is generated only when a receiving pulse is present in the body side 10 during the gate period $t_2$. Accordingly, a receiving pulse will be detected when the reflector 20 is at a distance of $$v\ t_1/2(m) \sim v\ (t_1 + t_2)/2(m)$$

from the transmitting element 104 and the receiving element 105 of the body 10 wherein the velocity of the ultrasonic wave propagating in air is shown as $v$ ($m$/sec), the period from the transmitting pulse to the gate pulse is shown as $t_1$ (sec.) and the gate period is shown as $t_2$(sec.).

It is possible in accordance with the above to set a desirable detective distance by selecting the periods $t_1$ and $t_2$. When the system is used for preventing the collision of two cranes located on the ceiling and running on the same rail, and the body 10 is fitted to the crane requiring the alarm output and the reflector is fitted to the other crane and positioned so as to face it to the body 10 then the alarm output will be obtained from the body side 10 at the time that the distance set by the formula below is approached.

$$v\ (t_1 + t_2)/2(m).$$

Accordingly, the alarm sound can be sent to the crane operator or the controller and the crane can be properly actuated. It should be appreciated that the system of this invention can be applied for preventing the collision not only between the two cranes, but also between the crane and a wall of a building or the like.

The system of this invention can also be effectively applied for preventing the collision between two moving members running on parallel yards with each other, such as different level ceiling cranes.

Figure 3:
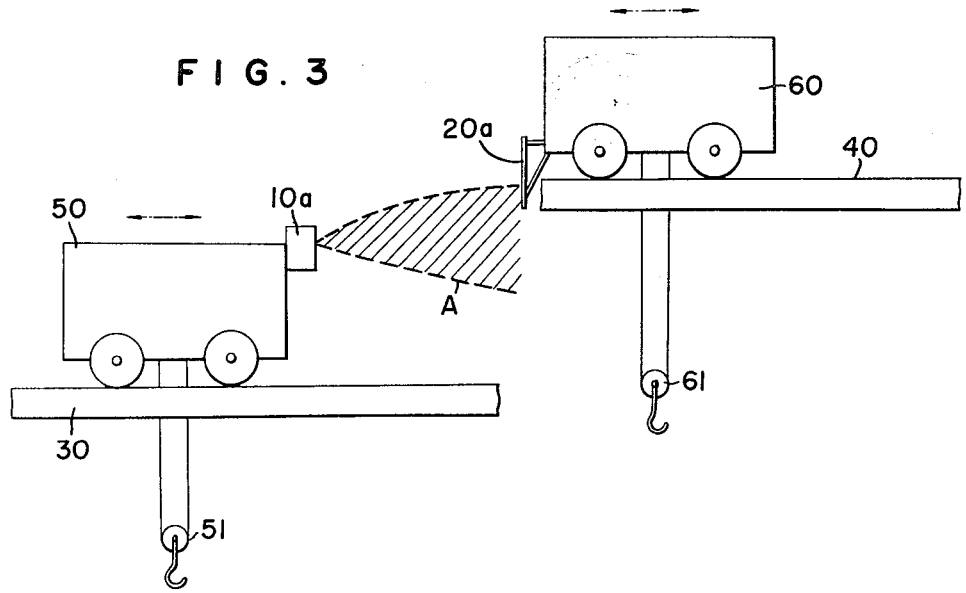
FIG. 3 is a schematic view illustrating cranes on different ceiling levels.

FIG. 3 shows the usual structure of different level ceiling cranes. In FIG. 3, the reference numeral 30 designates a lower rail and the reference numeral 40 designates an upper rail. Each of the rails is laid down on a yard and in parallel with each other. The reference numeral 50 designates a lower crane moving on the lower rail 30 and the reference numeral 60 designates an upper crane moving on the upper rail 40. Each crane has a respective winch 51 and 61 for lifting and lowering in a vertical direction.

The body 10a is fitted to the lower crane and the reflector 20a is fitted to the upper crane at a portion which departs from the center of each of the cranes. The ultrasonic wave signal from the body 10a is broadened at the portion A, shown by the oblique lines, and the ultrasonic wave signal from the body 10a is returned back through the reflector 20a to the body 10a by utilizing the broadened characteristics.

In the system shown in FIG. 3, it should be understood that an operation for preventing collision is not always necessary, even though the two moving members, i.e., the two cranes 50 and 60 are approached towards a specific distance. However, if for example the upper crane is hanging an article by lowering the winch 61 there may be a possibility to cause a collision, if at the same time the crane 50 is moving towards the crane 60 and approaches the specific distance. Accordingly, if such occurs it will be necessary to operate the system of this invention for preventing a collision when both cranes 50 and 60 are approaching the specific distance.

However, when the upper crane 60 is not hanging an article and the winch 61 is lifted up, it is usual that the distance between the two rails 30 and 40 will be set so that there is no possibility of a collision. Accordingly, under such conditions it is not necessary to operate the system of this invention for preventing a collision even though the two cranes 50 and 60 are approached to the specific distance.

When the collision preventing system of FIG. 1 is applied to the system shown in FIG. 3, a reflected wave from the reflector 20a will be detected, whereby an operation for preventing collision will be caused in every case wherein the two cranes 50 and 60 are approached to the specific distance, i.e., $$V (t_1 + t_2)/2(m).$$

Accordingly, the operating efficiency of the above is somewhat decreased by applying needless collision preventing action, since as discussed above it is not always necessary to provide a collision preventing operation when the cranes 50 and 60 are approached to the specific distance.

Figure 4:
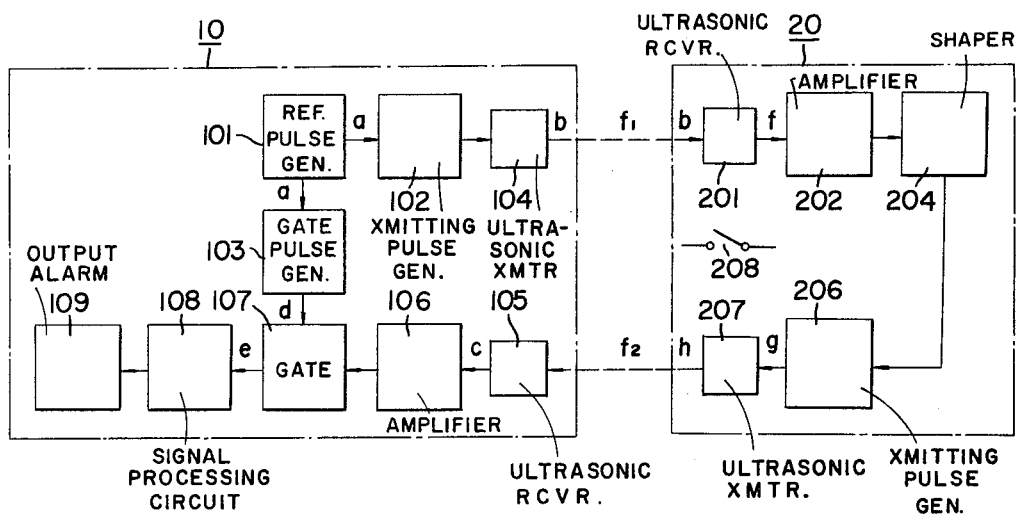
FIG. 4 is a block diagram of a preferred embodiment of this invention which is suitable for the cranes shown in FIG. 3.

FIG. 4 is a block diagram of another and preferred embodiment of the system according to this invention for eliminating the above disadvantage. FIGS. 5a - 5h have graphs of various waveforms for describing the operation of FIG. 4. In FIGS. 4 and 5a–5h the reference numeral 10 designates the body of the ultrasonic wave type collision preventing system of this invention which is fitted to one of the two moving members for which collision is to be prevented, such as the lower crane 50 shown in FIG. 3. The body is formed the same as that shown in FIG. 1, and operates similar to that shown in FIGS. 2a–2e, as shown in FIGS. 5a–5e. However, the frequency of the ultrasonic wave signal from the transmitting element 104 is set to $f_1$, while the receiving element 105 is formed to receive an ultrasonic wave signal having a different frequency $f_2$ ($f_2 \neq f_1$). Accordingly, the receiving element 105 will not receive an ultrasonic wave signal having the frequency $f_1$ such that even though the ultrasonic wave signal from the transmitting element 104 is reflected from the active reflector such as an iron plate, the signal will not be received, nor will the transmitting leak signal Sr from the transmitting element 104 be received.

Figure 5:
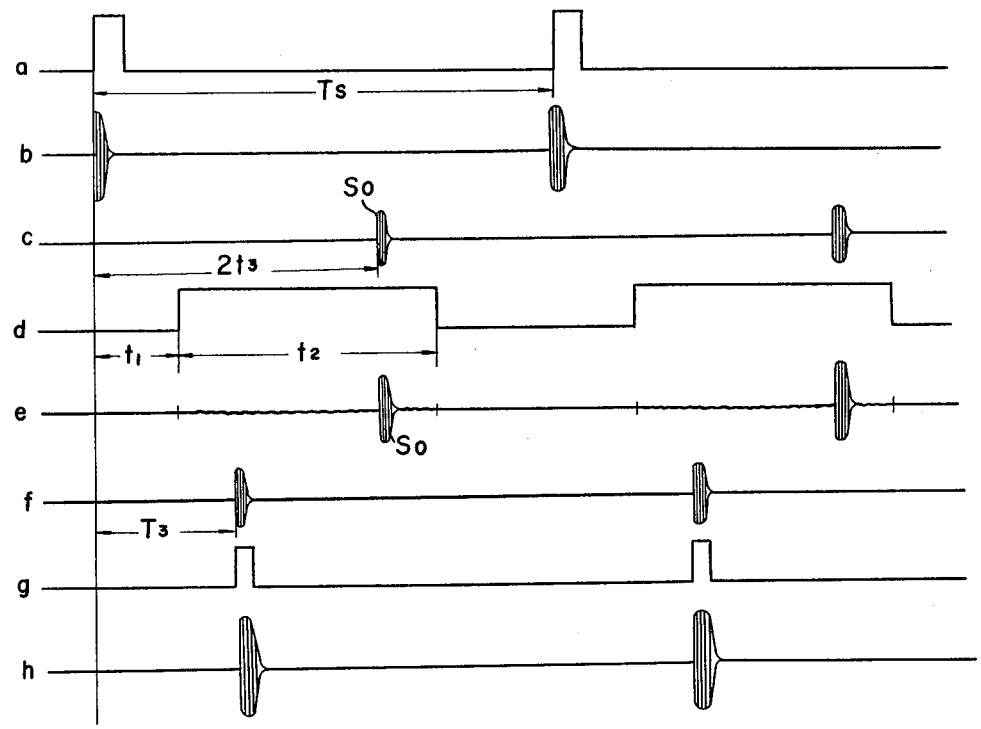
FIG. 5 is a graph for showing various signal waveforms at portions of the block diagram of FIG. 4.

The reference numeral 20 designates the active reflector which is fitted to the other moving member, such as the upper crane 60 shown in FIG. 3, and the same receives the ultrasonic wave pulse sent from the body 10 by the receiving element 201 which receives the ultrasonic wave signal having the frequency $f_1$ which is the same as that of the transmitting element 104 of the body 10. The received signal is thereby converted into a corresponding electrical signal, as shown in FIG. 5f. The received signal pulse is then amplified in the amplifier circuit 202 and the waveform is shaped by the waveform shaping circuit 204 as shown in FIG. 5g.

The transmitting pulse generating circuit 206 is triggered by the shaped pulse waveform and the ultrasonic wave pulse resulting therefrom is shown in FIG. 5h and is emitted from the transmitting element 207 in a forward direction from the reflector 20. The receiving element 207 of the reflector 20 is thus formed to transmit the ultrasonic wave signal having the frequency $f_2$ which is the same as that of the receiving element 105 of the body 10.

The reference numeral 208 designates a switch for controlling the operation of the reflector 20, and the same is automatically controlled depending upon the condition of the upper crane 60 of FIG. 3. Thus, when the upper crane 60 does not have any article hung therefrom and the winch 61 is lifted up so that there is no possibility of a collision, the switch 208 will be OFF and when the possibility of a collision is present then the switch will be ON. The switch 208 can be operated by the operator of the upper crane 60. The switch 208 is formed to serve as a power source switch for all of the reflector 20, i.e., the receiving element 201, the amplifier circuit 202, the waveform shaping circuit 204 and the transmitting element 207.

When the switch 208 is OFF, the reflector 20 is inactivated. Obviously, the switch 208 can be replaced by a switch which controls at least the operation of the receiving element 201, the amplifier circuit 202, the waveform shaping circuit 204, the transmitting pulse generating circuit 206 or the transmitting element 207.

It should be understood that the period $t_3$ shown in FIGS. 5f–5h is the period required for propagating the ultrasonic wave between the body 10 and the reflector 20. In the above-described collision preventing system according to this invention, when the body 10 and the active reflector 20 are operated under normal conditions, the reflector 20 will detect to provide a detected output therefrom when the body 10 and the reflector 20 are between the distance $$V t_1/2(m) \sim V (t_1 + t_2)/2(m)$$

in a manner similar to the operation of the first embodiment.

If the switch 208 of the active reflector 20 is OFF so as to stop the operation of the active reflector 20, then the reflected wave will not be received even though the body 10 and the active reflector 20 are approached to each other, because of the difference of the frequencies transmitted and returned by the body 10. Accordingly, an output will not be provided from the body 10.

When the system of this invention is applied for preventing the collision of the two different level ceiling cranes, the active reflector 20 is fitted to the upper ceiling crane 60 and the body 10 is fitted to the lower ceiling crane 50 by replacing the body 10a and the reflector 20a shown in FIG. 3 with the body 10 and the reflector 20 of this embodiment.

When a wire rope is lowered from the upper ceiling crane 60 then as described above there is a possibility that the lower ceiling crane 50 will collide with it. When the switch 208 of the active reflector 20 is ON, the collision preventing system will actuate and the alarm signal will be obtained from the body 10 as the lower ceiling crane 50 approaches to the distance of $$V (t_1 + t_2)/2(m).$$

On the other hand, in the case where the wire rope of the upper ceiling crane 60 is winched up and the possibility of a collision is not present then the operation of the active reflector 20 will be stopped with the switch 208 of the active reflector 20 being OFF. As such, a detective output will not be supplied from the body 10 by the approaching of the lower ceiling crane 50 and accordingly the lower ceiling crane can be run under the upper ceiling crane 60.

The change between the transmitting frequency of the body 10 and the receiving frequency of the active reflector 20 can be easily attained by using two different types of ultrasonic wave oscillating elements, such as a barium titanate type element and a lead zirconate type element for the transmitting elements 104 and 105 and the receiving elements 201 and 207 used in the body 10 and the active reflector 20, even though the shapes of the elements used are the same. (For example, an ultrasonic wave oscillating element having a resonance frequency of about 40 $KH_z$ can be obtained by employing a barium titanate type cylindrical oscillating element having a 38 mm diameter, while that of about 28 $KH_z$ can be obtained by employing a lead zirconate type cylindrical oscillating element having the same shape).

According to experiments it has been found that even though the body 10 and the reflector 20 using two types of the oscillating elements are fitted at positions wherein the centers thereof depart from each other at a distance of from about 50 cm to 1 m, it has been confirmed that the system can be operated for preventing collisions. It is possible with this invention to fit the body and the reflector on two moving members running in parallel, so as to actuate the collision preventing system, but this is possible only when the two members pass each other and a collision avoidance operation is required.

It should now be apparent that the system of this invention employs an ultrasonic wave signal whereby it can be expected to accurately operate in atmospheres of smoke and steam which are hard to see through.

In the system of this invention, the transmitting element for transmitting the ultrasonic wave signal is fitted to each of the two relatively moving members such that any disturbance or loss of the wave caused by reflection is not present and the system can be accurately operated at a relatively long distance in comparison with the conventional systems using as an active reflector only an iron plate or the like on one of the two moving members.

In addition, in the system of this invention, the ultrasonic wave signal transmitted at a specific frequency is used and the output device is actuated depending upon the corresponding ultrasonic wave signal returned at the particular range during the specific period after transmitting the ultrasonic wave signal, whereby the system can be operated with high accuracy and stability in comparison with the conventional systems which operate depending upon the change of the transmitting level.

Moreover, in the system of this invention, an erroneous operation caused by noise or the like can be readily prevented by using a means, such as the gate circuit 203, for preventing transmission from the second transmitting element after the ultrasonic wave signal is transmitted therefrom during the range of a period which is shorter than the period of the first transmitting element.

According to the system of this invention, it is now possible to accurately provide a collision prevention operation only when required, whereby the efficiency of operation can be increased.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. An ultrasonic wave type collision preventing system for preventing collision between two relatively moving members which comprises:
   a first transmitting element for transmitting ultrasonic wave signals having a specific period;
   a first receiving element for receiving the ultrasonic wave signal from the first transmitting element;
   a second transmitting element for transmitting an ultrasonic wave signal corresponding to the first receiving element;
   a second receiving element for receiving the ultrasonic wave signal from the second transmitting element;
   an output device which operates when the second receiving element receives the ultrasonic wave signal from the second transmitting element during a specific time period after the transmission of the ultrasonic wave signal from the first transmitting element;
   one of said two relatively moving members being fitted to the first transmitting element, the second receiving element and the output device;
   the other member being fitted to the first receiving element and the second transmitting element;
   first means for preventing the transmission of the ultrasonic wave signal from the second receiving element during a first time period shorter than the period of the ultrasonic wave signal from the first transmitting element, after the transmission of the ultrasonic wave signal from the second transmitting element; and
   second means for preventing the transmission of the ultrasonic wave signal from the second transmitting element during a second time period which is shorter than the period of the ultrasonic wave signal from the first transmitting element, after the transmission of the ultrasonic wave signal from the second receiving element.

2. The ultrasonic wave type collision preventing system according to claim 1, wherein the first means includes a gate circuit which is activated only during a specific period after the transmission of the ultrasonic wave signal from the first transmitting element, said gate circuit being provided between the second receiving element and the output device, and having a range of distance for actuating the output device being set by adjusting the actuating period of the gate circuit.

3. The ultrasonic wave type collision preventing system according to claim 1, wherein the second means includes a gate circuit for preventing transmission which is actuated only during the second time period and is located between the first receiving element and the second receiving element.

4. The ultrasonic wave type collision preventing system according to claim 1, wherein the first transmitting element and the second transmitting element transmit ultrasonic wave signals of different frequencies.

5. The ultrasonic wave type collision preventing system according to claim 1, which further comprises:
   means for selectively stopping the operation of the member which is fitted with the first receiving element and the second transmitting element.

* * * * *